United States Patent [19]

Minemura et al.

[11] Patent Number: 5,761,172

[45] Date of Patent: Jun. 2, 1998

[54] METHOD OF OPTICAL REPRODUCTION USING PULSED LIGHT

[75] Inventors: Hiroyuki Minemura; Hisataka Sugiyama, both of Kodaira; Tetsuya Fushimi, Chigasaki; Harukazu Miyamoto, Kodaira, all of Japan

[73] Assignee: Hitachi, Ltd., Tokyo, Japan

[21] Appl. No.: 600,373

[22] Filed: Feb. 13, 1996

[30] Foreign Application Priority Data

| Mar. 25, 1994 | [JP] | Japan | 6-055419 |
| Jul. 1, 1994 | [JP] | Japan | 6-150795 |
| Feb. 13, 1995 | [JP] | Japan | 7-023739 |

[51] Int. Cl.⁶ ............................................... G11B 7/00
[52] U.S. Cl. ............................................ 369/59; 369/116
[58] Field of Search ................................ 369/59, 60, 47, 369/48, 49, 50, 54, 58, 13, 32, 116; 360/48, 51

[56] References Cited

U.S. PATENT DOCUMENTS

| 5,311,491 | 5/1994 | Yamagami et al. | 369/58 X |
| 5,436,770 | 7/1995 | Muto et al. | 369/59 X |
| 5,469,416 | 11/1995 | Yamagami et al. | 369/48 |
| 5,473,581 | 12/1995 | Yonezawa et al. | 369/13 |

*Primary Examiner*—Muhammad N. Edun
*Attorney, Agent, or Firm*—Antonelli, Terry, Stout, & Kraus, LLP

[57] ABSTRACT

An optical disk device which improves the S/N ratio of reproduced signals and increases the recording density on it. Pulsed reproducing light is projected onto the data detection points on the optical disk medium to reproduce the data. This enables the reproduction of signals of large optical intensity without raising the temperature of the recording layer. A servo region is irradiated with DC light to form channel clocks from the PLL.

64 Claims, 9 Drawing Sheets

METHOD OF OPTICAL REPRODUCTION USING PULSED LIGHT

This application is a continuation-in-part application of application No. PCT JP 9500542 filed on Mar. 24, 1995, and the disclosure of PCT JP 9500542 is hereby incorporated for reference.

BACKGROUND AND SUMMARY OF THE INVENTION

The present invention relates to a device for optically recording and reproducing data. More specifically, the invention relates to a method of increasing the recording density of an optical disk device by which data are recorded into a disk-like medium and are reproduced therefrom, and to a medium.

Optical disk devices that are currently available in the market have a surface recording density of about 880 megabits/square inch. The laser beam used for this device has a wavelength of 780 nm, the objective lens has an NA of 0.55, the recording system is based on a mark length recording, and the servo system is of a continuous servo type. Details of such systems have been standardized in the documents of ECMA (European Computer Manufacturer Association).

In order to enhance the recording density of the optical disks, it can be contrived to narrow the gap (track pitch) between the data tracks and to narrow the gap (mark pitch) between the data marks which are arranged in the direction of light spot scanning. The following three methods have heretofore been proposed as technologies for enhancing the recording density of the optical disks.

(1) Method based on the two-dimensional equalization processing.

When it is attempted to narrow the track pitch or to narrow the mark pitch, there arises a problem that the surrounding data mark signals leak two-dimensionally into the data mark signals that are to be reproduced. This problem can be solved by a two-dimensional equalization processing system that cancels the leaking components of data (Japanese Patent Laid-Open No. 257474/1990). According to this system, the data can be highly densely recorded into a desired track i since the crosstalk and inter-code interference are decreased based upon the signals reproduced from the tracks 1−i and i+1.

(2) Method based on the multi-value recording.

Another method of increasing the recording density can be represented by a multi-value recording/reproducing system for recording and reproducing the data by changing the size of the recording mark depending upon the multi-value data (Japanese Patent Laid-Open No. 302426/1988). According to this system, the data are recorded by changing the area of the recording mark, making it possible to record many bits on a recording element of a predetermined size. It is therefore allowed to highly densely record and reproduce the data without the need to decrease the spot diameter at the time of reproduction, or without the need to decrease the mark pitch or the track pitch.

(3) Method of using a nonlinear optical material layer.

In order to record tiny marks on an optical data recording medium, there has been proposed technology which forms marks on a recording layer only for the regions of intense light among the light spots by utilizing an over-saturation absorption layer such as of a photochromic material (Japanese Patent Laid-Open No. 111330/1994). According to this system, the peak intensity of the reproducing light is set to be nearly the same as the peak intensity of the recording light. The reproducing light is transformed into pulsed light and its duty ratio is changed, so that the average intensity of the reproducing light becomes smaller than the average intensity of the recording light. The size of the light spot on the recording layer can be decreased owing to the nonlinear optical effect of the photochromic material layer. Since the peak intensity of light is the same, the same spot size can be obtained in recording and reproduction. It is therefore allowed to record and reproduce the data with recording marks smaller than the light spot. As the nonlinear optical materials, there can be exemplified organic compounds of the types of phthalocyanine, naphthalocyanine and the like.

(4) Method relying upon super-resolution.

A method of improving resolution in the circumferential direction of the optical disk can be represented by a phase-change super-resolution technology ("A High Density Read-only Optical Disk System using Super-Resolution with an SHG Green Laser", Ono, K. Yasuda, A. Fukumoto and M. Kaneko: Proc. Symposium on Optical Memory (SOM) 1994, pp. 25). This technology utilizes the fact that a phase-change recording layer changes its optical constant in a molten state, wherein regions of a molten state are used as apertures among the light spots, and the signals of these portions are reproduced. When an optical disk medium is scanned by a light spot of a predetermined power, the temperature distribution on the medium forms a profile in which high temperatures spread backwardly of the spot. Therefore, the aperture in a molten state is distorted backwardly of the light spot. Even when the recording mark of a symmetrical shape is reproduced, therefore, the signal becomes asymmetrical in the direction of time axis. When the phase-change film is melted and cooled repetitively, furthermore, the material is fluidized due to unbalanced stress acting upon the phase-change layer, resulting in a change in the thickness of the layer. In the case of the optical disk utilizing the phase-change super-resolution technology, therefore, the number of times of reproduction that can be carried out is limited to be about 10,000 times.

Concerning the above-mentioned conventional technologies (1) and (2), the recording density is basically improved relying upon the signal processing, which does not mean an improvement in the quality of the reproduced signals of before being processed. Therefore, limitation is imposed on increasing the recording density due to a ratio (S/N ratio) of the noise components to the signal components contained in the reproduced signals. Conversely speaking, even in the conventional system, an improvement in the S/N ratio of the reproduced signals makes it possible to decrease the mark pitch and the track pitch and, hence, to increase the recording density. The signal components are chiefly determined by a degree of signal modulation of the optical disk medium, size and power of light spot used for the reproduction. The noise components are caused by the retardation of the optical disk medium and substrate structure such as guide grooves, etc. or are caused by nonuniformity of the recording film, or are caused by shot noise in the optical detector in the optical system and in the reproduction circuit system, electric noise in the circuit system, and laser noise stemming from fluctuation in the oscillation of the semiconductor laser. Limitation is imposed on reducing the noise of the optical disk medium and on increasing the degree of modulation and, hence, limitation is imposed on increasing the recording density even relying upon the above-mentioned conventional technologies.

Concerning the above-mentioned technology (3), a nonlinear optical material layer must be newly added to a conventional optical disk medium, causing the structure of the optical disk medium to become complex. The nonlinear optical material layer used in this technology can be exemplified by organic compounds of the types of phthalocyanine, naphthalocyanine, etc. The magneto-optic disks and phase-change optical disks that have now been known are all constituted by an inorganic material layer and are produced through the same processing by line sputtering. In order to newly add the nonlinear optical material layer of such an organic compound, however, it becomes necessary to interrupt the sputtering process and introduce a process such as spin coating, inevitably resulting in a complex structure of the optical disk medium and an increase in the cost.

Concerning the above-mentioned technology (4), the aperture used for the phase-change super-resolution fails to assume a symmetrical shape with respect to the light spot; i.e., the reproduced signal becomes asymmetrical in the direction of time axis, which makes it difficult to accomplish linear signal processing. Moreover, fluidization in the phase-change film imposes limitation on the number of times of reproduction.

In view of the above-mentioned problems inherent in the prior art, it is an object of the present invention to provide an optical disk recording/reproducing system and a medium solving the problems with respect to the following three points.

(1) To provide a recording/reproducing system improving an S/N ratio of signals reproduced from the optical disk.

(2) To increase the recording density without causing the film structure of the optical disk medium that has hitherto been known and the manufacturing process to become complex.

(3) To improve symmetry of the signals reproduced in the phase-change super-resolution technology and to increase the number of times of reproduction that can be carried out.

In order to solve the above-mentioned problems according to the present invention, the reproducing light is modulated in the form of pulses in synchronism with the reproduced clocks. This makes it possible to improve the S/N ratio of the reproduced signals. The signal component in the reproduced signal increases in proportion to the power of the reproducing light. Here, among the noise components, the electric noise in the circuit system remains constant irrespective of the power of the reproducing light. Therefore, the S/N ratio can be improved if the power of the reproducing light is increased. However, an increase in the reproduction power results in an increase in the temperature of the data recording film in the optical disk medium, whereby Kerr rotation angle decreases in the magneto-optic recording layer. Moreover, an increase in the reproduction power causes the temperature of the recording layer to reach the Curie point at which the data are erased. In the case of the phase-change type recording layer, furthermore, a large reproduction power causes the temperature of the recording layer to become higher than the temperature of crystallization, whereby amorphous marks that are recorded are crystallized to lose data. According to the present invention, therefore, the reproducing light is projected in the form of pulses onto the data points in order to increase the reproducing light output without causing the temperature of the recording layer to rise beyond a predetermined temperature, making it possible to improve the S/N ratio.

According to the present invention, there is no need to add a new layer to the conventional optical disk medium and, in particular, there is no need to introduce a layer formed by a different process such as of an organic nonlinear optical material.

When the present invention is combined with a phase-change super-resolution technology, furthermore, the temperature is symmetrically distributed compared with the DC reproducing light making it possible to improve asymmetry in the reproduced signals. At the same time, a decreased region is melted by the pulsed light. Therefore, the molten region does not span across the neighboring points being detected, and the phase-change layer is prevented from being fluidized.

According to the recording/reproducing method of the present invention, the reproducing light is projected in the form of pulses onto the points of detection in synchronism. Therefore, the temperature rise of the recording layer is suppressed, the signals are reproduced with large optical output and, hence, the S/N ratio of the reproduced signals is improved and the recording density is enhanced. According to the present invention, furthermore, the constitution of the optical disk medium does not become complex. In the reproduction utilizing the super-resolution, furthermore, the temperature distribution can be improved to assume a symmetrical shape, enabling the reproduction to be carried out an increased number of times.

When the clock signals formed on the optical disk medium are reproduced, continuous light is applied to prevent channel clocks from varying. By optimizing the thermal capacity of the metal layer that is added to the optical disk medium, furthermore, the temperature rise of the recording layer is suppressed during the reproduction by light pulses, and the temperature is quickly raised when the data are recorded, preventing the reduction in the recording sensitivity.

According to the present invention, furthermore, the signals can be reproduced in synchronism with the timings for reproducing the pulses. If the system for modulating the recorded signals is property set, therefore, the signal band of an electric circuit in the reproduction system needs to be narrower than that of the DC reproduction. This makes it possible to cut disk noise in the low frequency bands and, hence, to decrease the amount of noise.

Based upon the combination of these technologies, an optical disk which is 130 mm in diameter is allowed to have a capacity of not smaller than 10 gigabytes.

DETAILED DESCRIPTION OF THE INVENTION

An embodiment of the present invention will now be described with reference to the drawings.

Figure 1A:
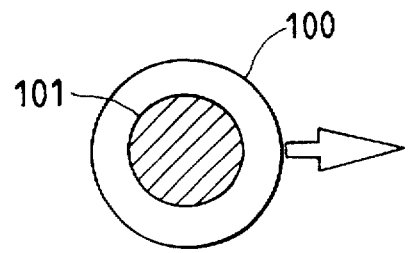
FIG. 1a is a plan view illustrating a relationship between a mark and a light spot.

FIG. 1a illustrates a state where an isolated recording mark 101 is irradiated with a light spot 100.

Figure 1B:
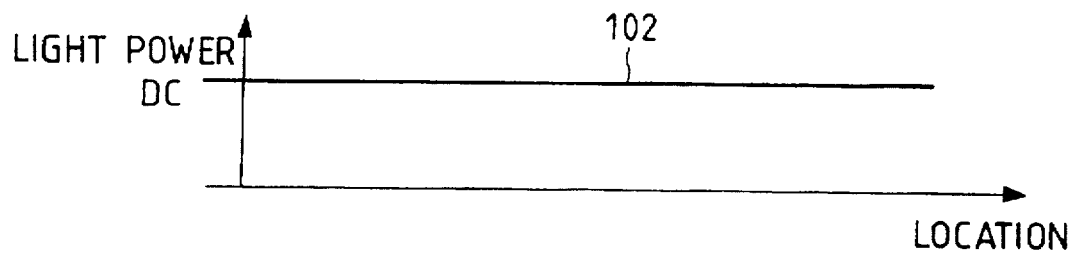
FIG. 1b is a diagram of waveforms of DC reproducing light.
Figure 1C:
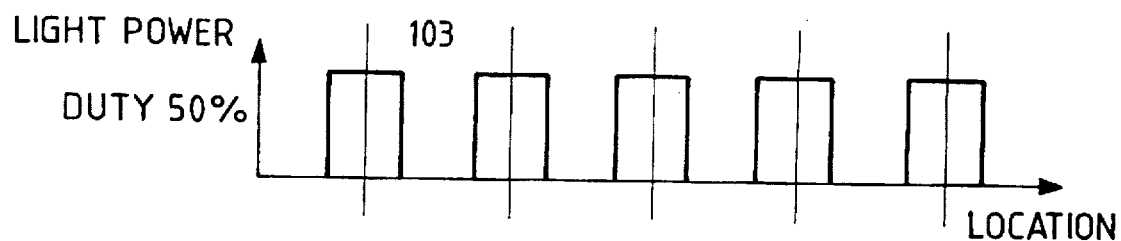
FIG. 1c is a diagram of waveforms illustrating a principle of a method of pulsed reproduction at a duty of 50%.
Figure 1D:
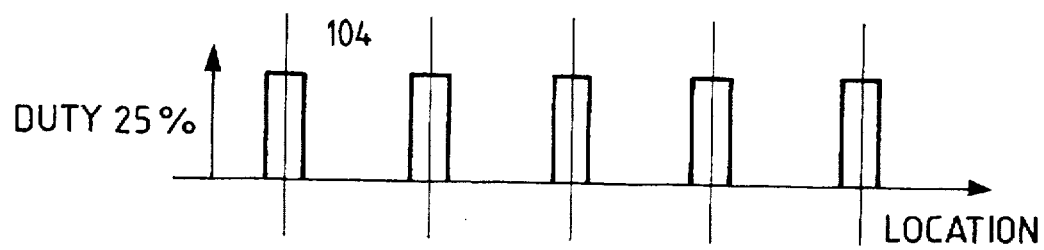
FIG. 1d is a diagram of waveforms illustrating a principle of a method of pulsed reproduction at a duty of 25%.

FIGS. 1b, 1c and 1d illustrate waveforms of the reproducing light projected onto a recording medium. FIG. 1b shows a conventional DC reproduction waveform 102. FIG. 1c shows a reproduction waveform 103 of pulsed light having a duty of 50%, and FIG. 1d shows a reproduction waveform 104 of pulsed light having a duty of 25%.

Figure 1E:
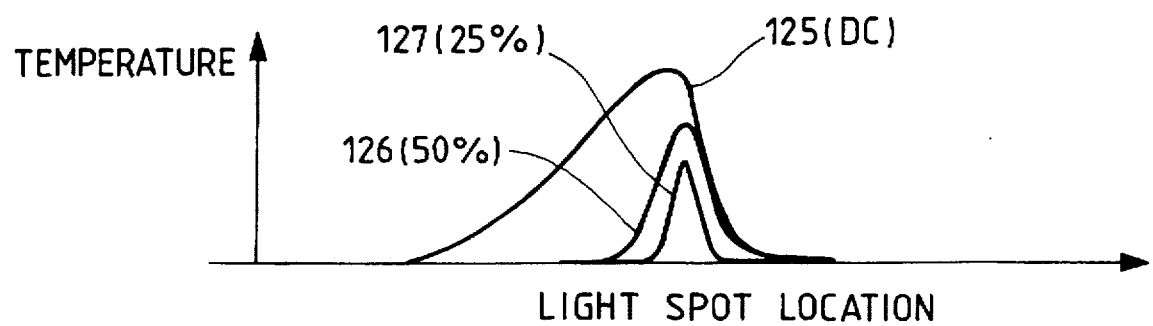
FIG. 1e is a graph showing temperature distributions on the film surface.

FIG. 1e illustrates temperature distributions of the recording film in the above-mentioned three reproduction systems. The temperature distribution becomes as represented by a curve 125 during the DC reproduction, becomes as presented by a curve 126 during the pulsed reproduction of a duty of 50%, and becomes as represented by a curve 127 during the pulsed reproduction at a duty of 25%.

Figure 1F:
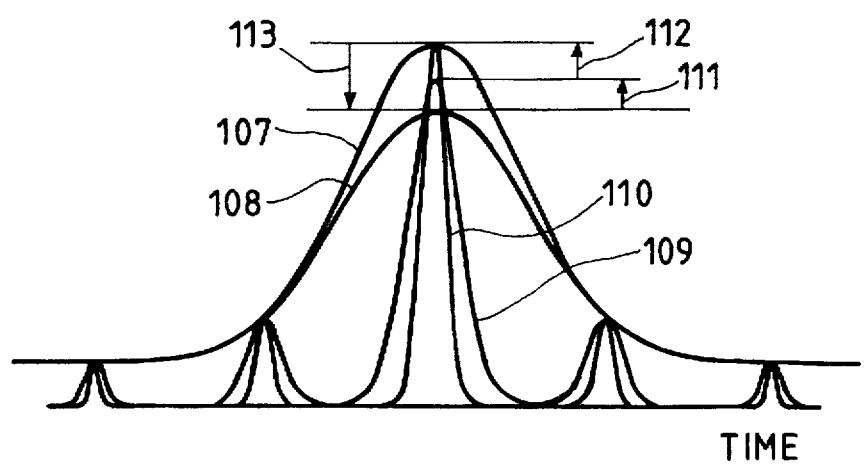
FIG. 1f is a diagram of waveforms of isolated reproduced signals.

FIG. 1f illustrates waveforms of isolated reproduction signals for a point to be detected, i.e., shows impulse responses.

In the case of the magneto-optic disk, the temperature of the recording layer and the Kerr rotation angle θK which is the signal component decrease with an increase in the temperature of the recording layer. That is, the amplitude of signal decreases with an increase in the temperature. Referring to FIG. 1f, an ideal signal waveform 107 that is obtained when the temperature of the recording layer is very low loses the amplitude to a level 113 as represented by a curve 108 during the DC reproduction waveforms due to a rise in the temperature of the recording layer. By projecting the pulsed reproducing light onto the points to be detected in synchronism to reproduce signals, it is allowed to prevent the temperature rise of the recording layer and to realize reproduction close to the ideal signal waveforms.

FIG. 2 illustrates relationships of the optical system and the frequency characteristics in the waveform equalization processing in the method of pulsed reproduction of the present invention. The description hereinafter deals with the case of a binary recording system of the NRZ (non-return-to-zero) type and the case of a multi-value recording system. Experiment was conducted by using, as a recording medium, a magneto-optic disk under the conditions of a wavelength of 680 nm, a numerical aperture of 0.55 and a bit pitch of 0.45 μm.

(1) In the case of the NRZ type.

Figure 2A:
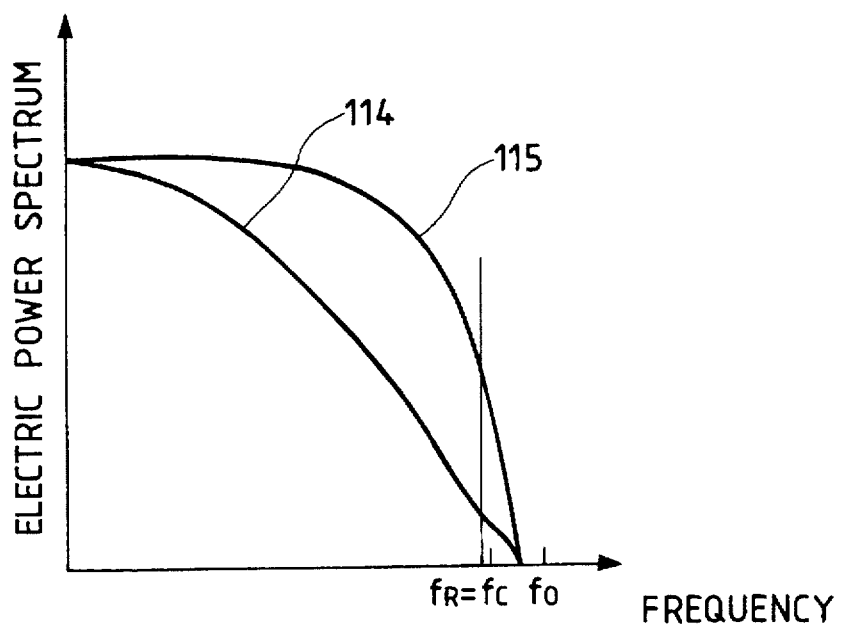
FIGS. 2a and 2b are graphs showing relationships of the optical system of the present invention and the frequency characteristics in the waveform equalization processing.

As shown in FIG. 2a, the equalization processing is executed so that the impulse response characteristics 114 of the optical system are brought close to Nyquist characteristics 115. At the time of reproducing the pulses, the frequency fR of the reproduced pulses is brought into agreement with the bit frequency fc as shown in FIG. 2a. Here, the signal band of the detection system is optimized near the cut-off frequency fO in order to maximize the S/N ratio. In this case, when the signal band is set to be higher than the bit frequency fc, band accumulated value of noise increases. When the signal band is set to be lower than the bit frequency fc, on the other hand, the pulse peak value drops, i.e., the signal component decreases with respect to the irradiation with pulse.

By taking this into consideration, the signal band is set by a low-pass filter of a high order. As shown in FIG. 1, for example, in the pulsed reproduction at a duty of 50%, a steep temperature distribution 126 is obtained on the surface of the layer in contrast with the temperature distribution 125 on the surface of the layer during the DC reproduction. As a result, the reproduced signals 109 have a sinusoidal waveform of fundamental wave components of a pulse frequency fR, and the amplitude is increased as denoted by 111 with respect to the reproduced signals 108 at the mark position during the DC reproduction. This helps improve the S/N ratio by 1.5 dB.

(2) In the case of the multi-value recording.

When, for example, quaternary codes are applied to the binary codes of the NRZ system, the frequency of the gaps among the data detection points can be halved to accomplish the same density.

Figure 2B:
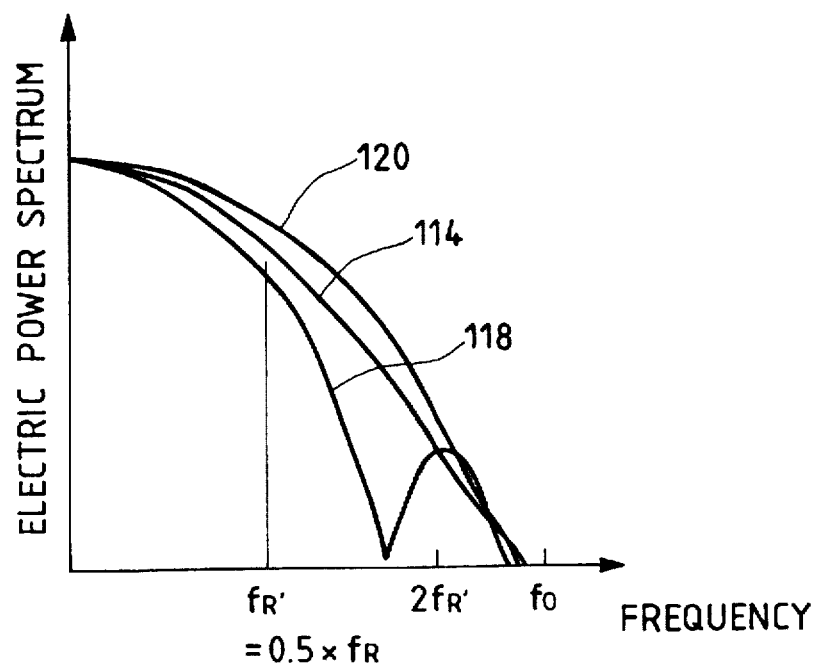

Referring to FIG. 2b, the frequency fR' of the pulsed reproducing light can be set to be half the frequency fR of the reproducing light for the NRZ codes. The response of the quaternary codes becomes as represented by a curve 118. Even in this case, the signal band is set near to a maximum cut-off frequency fO. Since the frequency fR' of the reproducing light is very smaller than the cut-off frequency fO, the fundamental wave components in the detected and reproduced pulse signals pass through without so much deformed despite the characteristics 120 of the low-pass filter are dispersed to some extent. This makes it possible to design a filter that best matches the quaternary multi-value response characteristics 118 in a high-frequency band. In order to increase the effect of pulse reproduction, furthermore, the pulse duty is decreased and the rise of temperature of the recording layer is suppressed. Referring, for example, to FIG. 1d, when the duty ratio is set to be 25%, there is obtained a temperature distribution 107 on the surface of the layer; i.e., Kerr rotation angle is not almost all decreased and, hence, a reproduced signal waveform 110 is obtained making it possible to increase the amplitude 112 to the same level as that of the ideally reproduced waveform. When the duty ratio is changed from 50%, however, it becomes necessary to pass not only the fundamental frequency but also harmonics. For instance, at the duty 25%, the signals of up to a double frequency 2 fR' must be passed through. In the case of the multi-value reproduction, the double frequency 2 fR' becomes lower than the cut-off frequency fO as shown in FIG. 2b and, hence, the duty ratio can be decreased from 50%. As a result, it is allowed to improve the S/N ratio by 2.5 dB compared with that of DC reproduction.

The method of reproduction of the present invention will now be described with reference to FIG. 3. Pulsed reproducing light 302 is projected in agreement with data detection points 301 in order to reproduce the data from record marks 304 in the data region 303. This makes it possible to reproduce the signals with intense light without raising the temperature of the recording layer. A well-known PLL (phase-locked loop) is used for forming channel clocks corresponding to the data detection points 301 from pre-pits 306 formed as clock marks in a servo region 305. In order to stably form the channel clocks, therefore, the phase of the signals reproduced from the pre-pits 306 must be compared with the phase of the channel clocks and corrected. For this purpose, the pre-pits 306 are reproduced using DC light 307. The pre-pits 306 are formed at predetermined positions in a sector. Therefore, a gate should be provided at positions of the pre-pits 306 to project DC light 307.

The reproducing light in the form of pulses is first projected onto the data region 303 in order to pre-heat this region, so that the temperature condition of the recording layer at the start point of the data region becomes the same as that of other regions. It is known that about five pulses are sufficient for pre-heating the general magneto-optic disks and phase-change optical disks at a linear velocity of 10 m/s, though the number of pulses may vary depending upon the constitution of the optical disk and the linear velocity.

Figure 3:
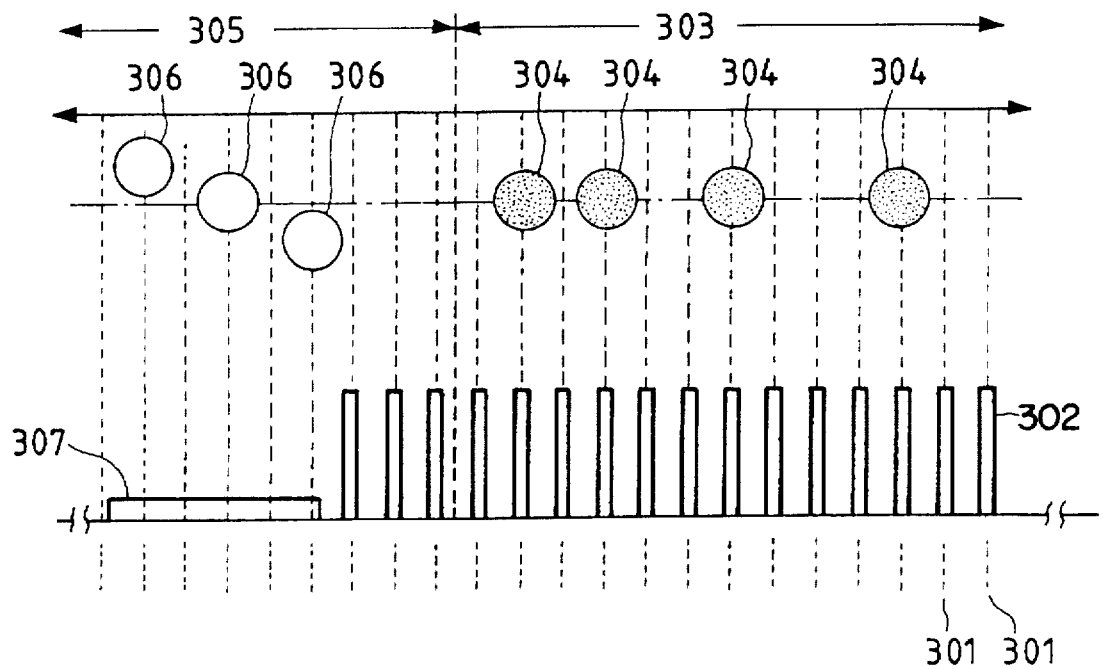
FIG. 3 is a diagram schematically illustrating a method of reproduction according to the present invention.

In the example of FIG. 3, the servo region 305 is irradiated with the DC reproducing light 307 relying upon the sample servo system in order to reproduce the clocks. However, the present invention can be similarly adapted even to the medium of the continuous servo system if the VFO, Sync and Resync regions are reproduced as clock marks with the DC reproducing light. Their positions are exclusively determined depending upon the format of data that are recorded. Therefore, there needs be provided a gate for reproducing the clock marks as mentioned earlier.

Described below are the reasons why the S/N ratio is improved by the present invention.

The signal components of an optical disk can be detected by an optical detector when a record mark is scanned with a light spot. In the case of the magneto-optic disk, the magnetization direction of the recording film is reproduced as the direction of Kerr rotation angle. In the case of the phase-change optical disk, a change in the crystalline structure of the recording film is detected as a change in the quantity of reflected light. In the case of the reproduction-only optical disk, ruggedness formed in the substrate is detected as a change in the quantity of reflected light by utilizing diffraction. In any case, the magnitude of the reproduced signal components varies in proportion to the intensity of the reproducing light provided a change in the temperature of the recording layer is negligibly small.

The noise components of the optical disk include disk noise caused by a change in the size of the record marks and fine ruggedness on the disk substrate, shot noise produced by the optical detector, noise in the circuitry inclusive of amplifier noise, and laser noise caused by a change in the output of the semiconductor laser which is the source of light. In general, disk noise is a predominant factor in the low-frequency zones, and shot noise becomes a predominant factor in the high-frequency zones. The noise level for calculating the S/N ratio is the summing-up of the above-mentioned noise components. Among these noise components, what increases in proportion to the intensity of the reproducing light is the disk noise only. The shot noise varies in proportion to the square root of the intensity of the reproducing light, and the noise in the circuitry and the laser noise remain nearly constant irrespective of the intensity of the reproducing light.

It will thus be understood that the S/N ratio increases with an increase in the intensity of the reproducing light. However, an increase in the intensity of the reproducing light becomes a cause of an increase in the temperature of the recording layer due to increased energy.

Figure 4:
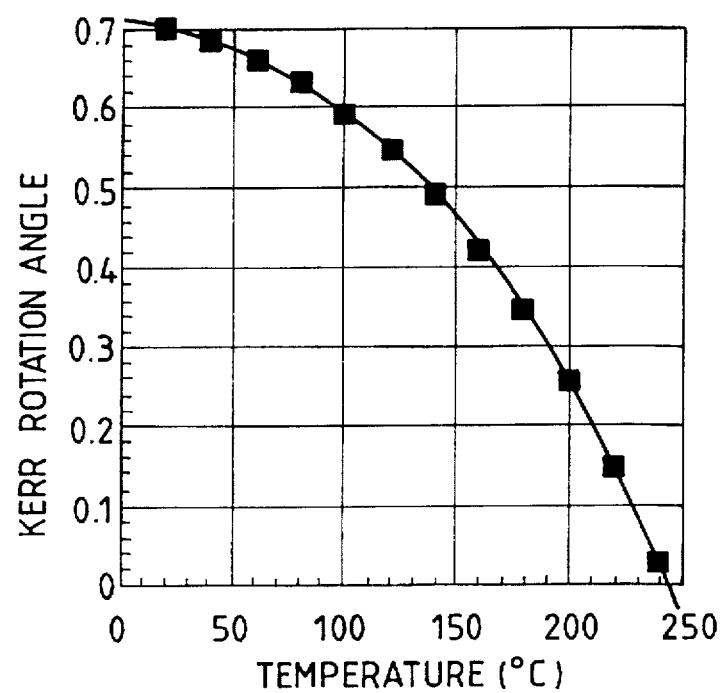
FIG. 4 is a graph illustrating the temperature dependency of Kerr rotation angle of a TbFeCo material which is typically used as a recording layer of a magneto-optic disk.

FIG. 4 illustrates the temperature dependency of Kerr rotation angle of TbFeCo which is a representative material for forming a recording layer of the magneto-optic disk. The Kerr rotation angle of the recording layer decreases with an increase in the temperature. Therefore, if the reproducing light has a too great intensity, the signal component decreases causing the S/N ratio to decrease. At the same time, as the temperature rises, the magnetization of the recording film loses stability and the disk noise increases. It is therefore desired that the temperature of the recording film during the reproduction does not rise above room temperature. Even in the phase-change optical disk, the data are erased as the temperature of the recording film reaches the crystallization temperature. Therefore, it is not allowed to increase the intensity of the reproducing light beyond a certain level.

In order to increase the S/N ratio, therefore, it is necessary to increase the intensity of light without raising the temperature of the recording layer. This can be accomplished by projecting the reproducing light in the form of pulses onto the data detection points as described earlier.

Figure 5:
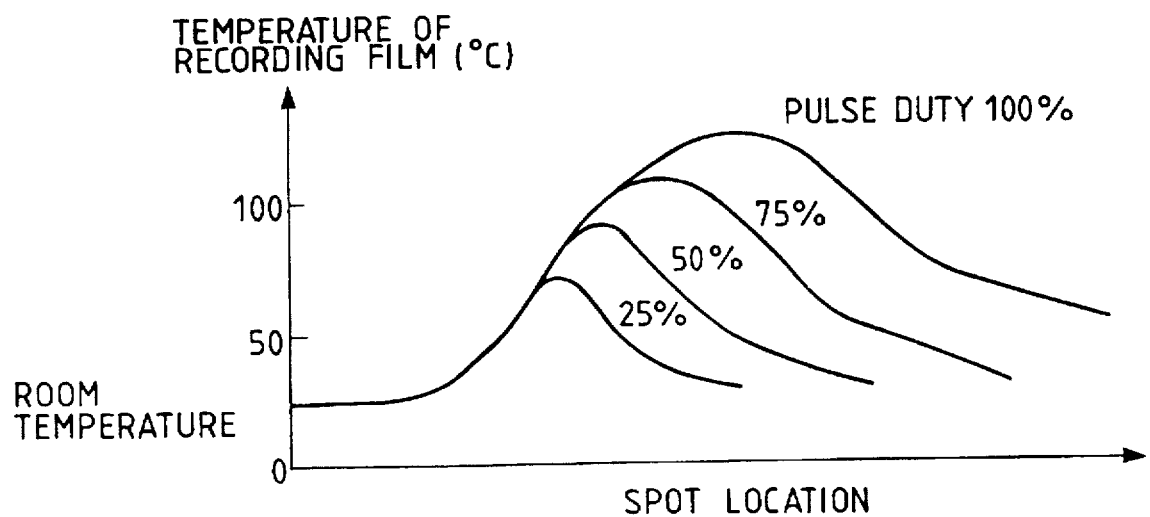
FIG. 5 is a graph illustrating a relationship between the duty of pulsed reproducing light and the temperature distribution of the recording layer.

FIG. 5 illustrates a relationship between the duty of the pulsed reproducing light and the temperature distribution on the recording layer. In FIG. 5, the heat was calculated by using a general magneto-optic disk under the conditions of a linear velocity of 10 m/s, peak power of reproducing light of 2 mW and a gap between the detection points of 0.4 μm. From the results of FIG. 5, if the duty is set to be not higher than 50%, the temperature rise becomes about ⅔ compared with that of DC reproducing light (duty of 100%). That is, the pulsed reproducing light can be projected with a peak power of 3/2 times as great, and the effect of the present invention is enhanced to a striking degree. From the practical viewpoint of not so increasing the frequency of the circuit, it is desired to use clock signals obtained by dividing the channel clocks by 2 to 4, and it is desired that the pulsed light has a duty of 25 to 50%. The channel clocks are set to be not higher than the cut-off frequency of the optical system. Therefore, the effect of the present invention is exhibited to the greatest degree when the following requirements are satisfied:

(1) $t<T/2$ and, preferably, $T/4<t<T/2$ (2) $\lambda/(4 \times NA \times V) < T$ where T denotes an interval between the channel clocks, t denotes an irradiation time of pulsed reproducing light, λ denotes a wavelength of the source of light, NA denotes a numerical aperture of the objective lens, and V denotes a linear velocity of the disk that is rotating.

In practice, when the reproducing light was transformed into pulses using a magneto-optic disk of a sample servo format, the S/N ratio could be improved by about 3 dB.

Further distinguished effects are obtained when the present invention is combined with other technology for enhancing the recording density.

There has been proposed the above-mentioned phase-change super-resolution system in an attempt to improve resolution of reproduction relying upon the constitution of the optical disk medium.

Figure 6:
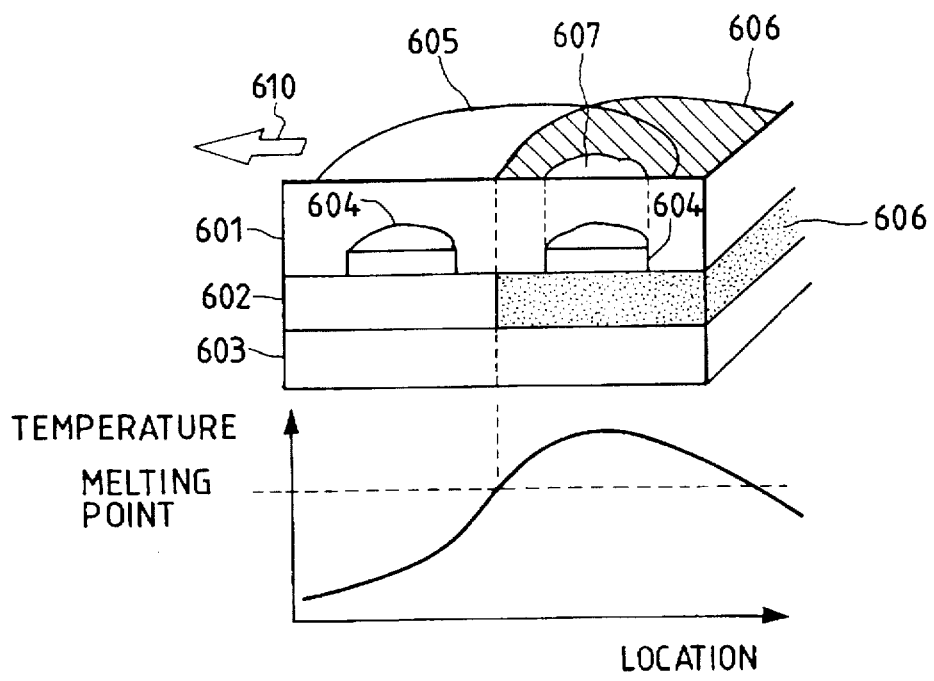
FIG. 6 is a sectional view schematically illustrating a phase-change super-resolution system.

FIG. 6 schematically illustrates the phase-change super-resolution system. The phase-change super-resolution system is based upon a principle in which an optical constant changes depending upon whether the phase-change layer is in a solid state or in a molten state. Use is made of an optical disk medium which is optically so designed that the reflection factor of the disk becomes nearly zero when it is in the solid phase and that the reflection factor assumes a predetermined value when it is in the molten phase. The optical disk has a laminated layer structure including, for example, a substrate 601, a phase-change layer 602 and a reflection layer 603. Pre-pits 604 are formed in the substrate. When the optical disk medium is irradiated with a light spot 605 that moves in the direction of arrow 610, the data can be reproduced only from a portion 607 where the light spot 605 overlaps a region 606 where the phase-change film 602 is melted, and the pre-pit 604 is detected in an isolated manner.

When the phase-change film is in the molten state, however, the recording film material is fluidized or is segregated to exhibit changing properties due to changes in the volume between the solid phase and the liquid phase, in the heat conductivity, in the specific heat and due to asymmetry in the temperature distribution. These are principal factors imposing limitation on the number of times of reproduction that can be carried out in the phase-change super-resolution system.

Figure 7:
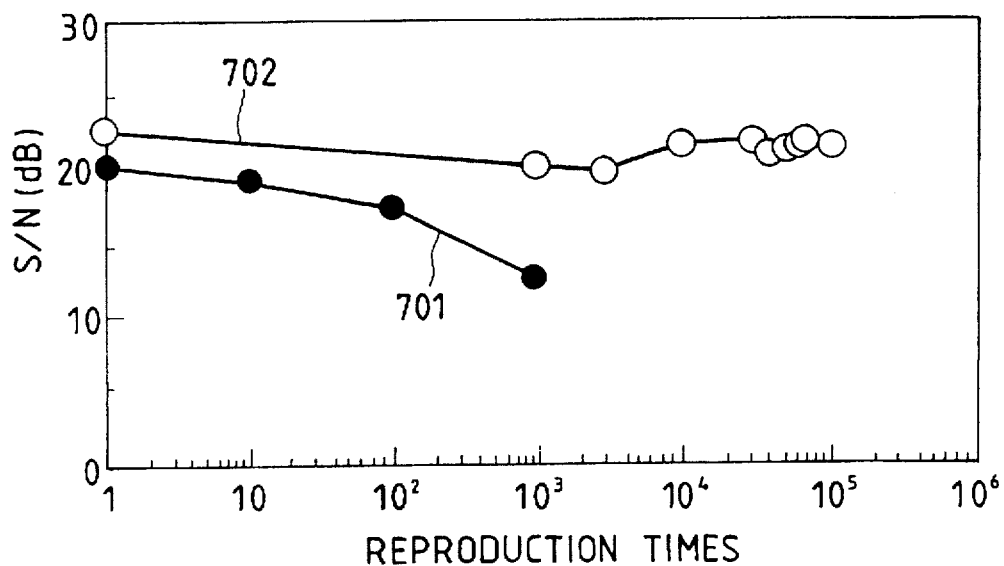
FIG. 7 is a graph illustrating a relationship between the S/N of the reproduced signals and the number of times of reproduction in the phase-change super-resolution system.

FIG. 7 shows the results indicating an increase in the number of times of reproduction that can be carried out by the phase-change super-resolution system of the present invention, wherein the ordinate represents S/N of the reproduced signals and the abscissa represents the number of times of reproduction. In the conventional DC light reproduction 701, the S/N ratio drops after about 1000 times of reproduction due to fluidization of the recording film, and the reproduction can be carried out no longer. According to the pulse reproduction system 702 of the present invention, on the other hand, the S/N ratio is not so much deteriorated even after the reproduction is repeated more than 100,000 times. The reasons are discussed below.

Figure 8:
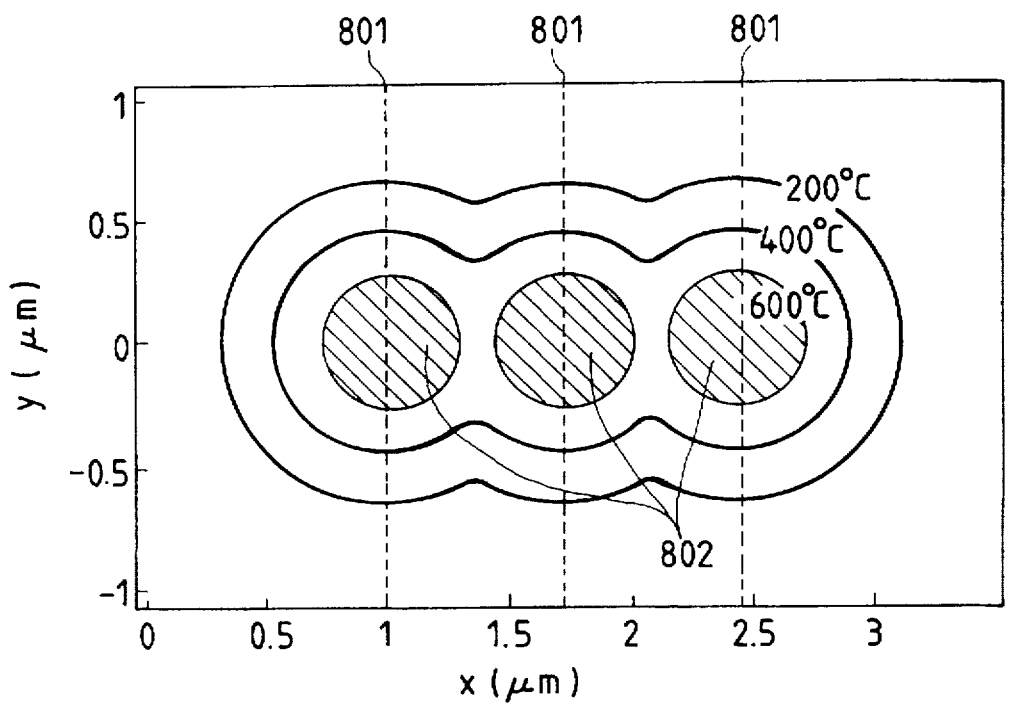
FIG. 8 is a diagram of distribution illustrating the calculated results of maximum temperatures in the phase-change layer of when the pulses are reproduced.

FIG. 8 shows the results of calculation of maximum temperature distributions in the phase-change layer of during the pulse reproduction. By suitably selecting the peak values of pulses, the neighboring detection points 801 are prevented from being linked together via molten regions 802. Since the recording layer is not fluidized to an extent to span across the neighboring detection points, the number of times the reproduction can be carried out increases to a striking degree.

Figure 9:
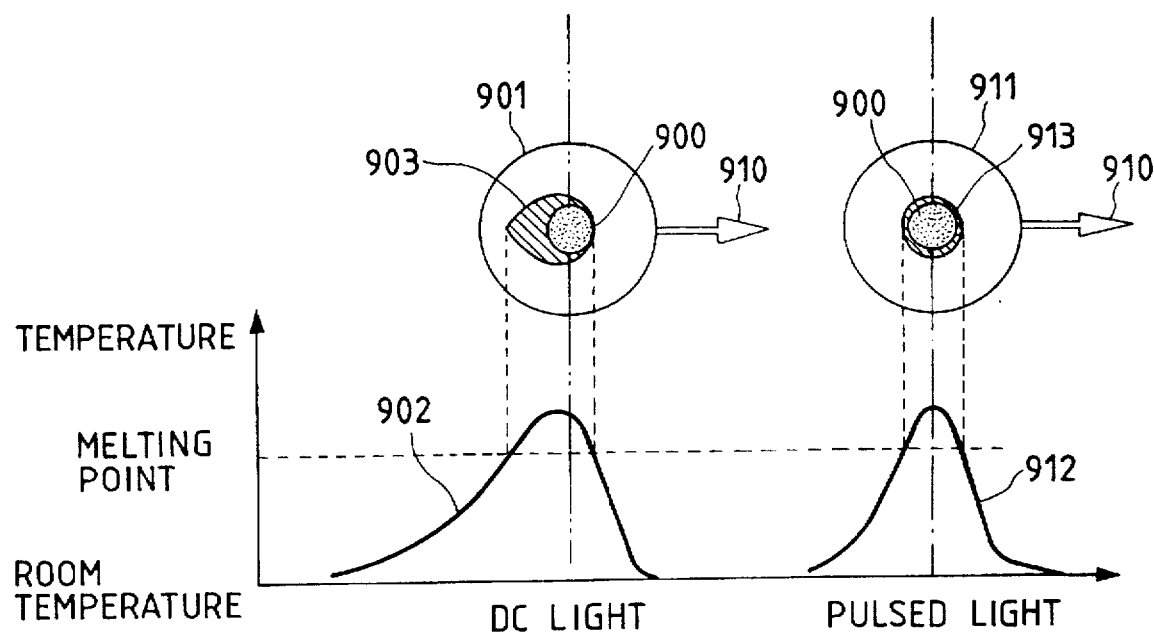
FIG. 9 is a diagram of waveforms illustrating a difference in the characteristics for reproducing signals in the case when DC reproduction light and pulsed reproducing light are used for the phase-change super-resolution system.

FIG. 9 illustrates a difference in the signal reproduction characteristics in the case when the DC reproduction light and pulsed reproducing light are used for the phase-change super-resolution system. In the case of the conventional DC reproducing light, the temperature distribution 902 on the phase-change recording layer is deviated rearwardly in the scanning direction due to the accumulation of heat upon irradiation with the light spot 901. Therefore, the aperture 903 assumes an asymmetrical shape. The signal reproduced therefrom assumes an asymmetrical shape making it difficult to process the signal. In the case of the reproduction using pulsed light, on the other hand, the heat due to the light spot 911 affects little, and the temperature distribution 912 and the aperture 913 are allowed to have symmetrical shapes. Therefore, the signal reproduced therefrom is adapted for being subjected to the linear processing. Reference numeral 900 denotes a record mark and 910 denotes a direction in which the light spot moves. When the pulsed light is projected simultaneously, the heat spreads little in the direction of the neighboring tracks making it possible to decrease the crosstalk.

The conventional phase-change super-resolution has been disclosed as technology for improving resolution of the reproduction-only optical disks. Here, this technology could be adapted to a phase-change optical disk in which the data could be recorded. The contents of this technology will now be described.

Figure 10:
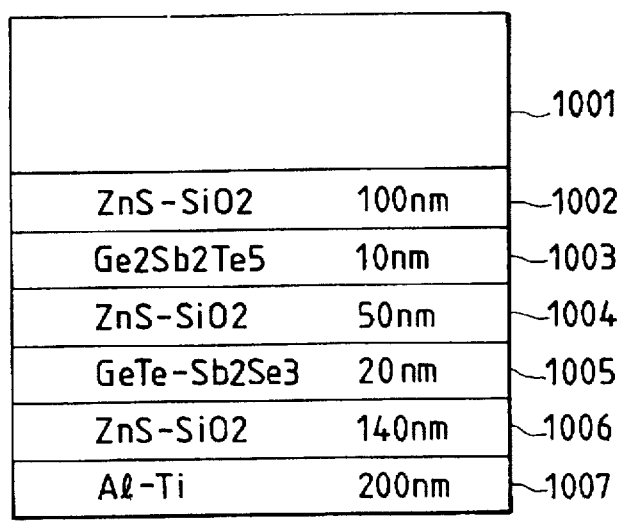
FIG. 10 is a sectional view illustrating the constitution of layers of when a super-resolution layer is added to a phase-change optical disk into which the data can be recorded.

FIG. 10 illustrates a constitution in which a super-resolution layer is added to the phase-change optical disk into which data can be recorded. On a polycarbonate substrate 1001 are laminated a first interference layer 1002, a super-resolution layer 1003, a second interference layer 1004, a recording layer 1005, a third interference layer 1006 and a reflection layer 1007 in the order mentioned. The recording layer 1005 is composed of a material GeTeSb2Te3, the super-resolution film 1003 is composed of a material Ge2Sb2Te5, the interference layers 1002, 1004 and 1006 are composed of a material ZnS-SiO2, and the reflection layer 1007 is composed of an Al-Ti alloy. The thicknesses of the layers diagramed here are only of explanatory for realizing the super-resolution. The layer constitution can be realized by, for example, a sputtering processing alone.

Figure 11:
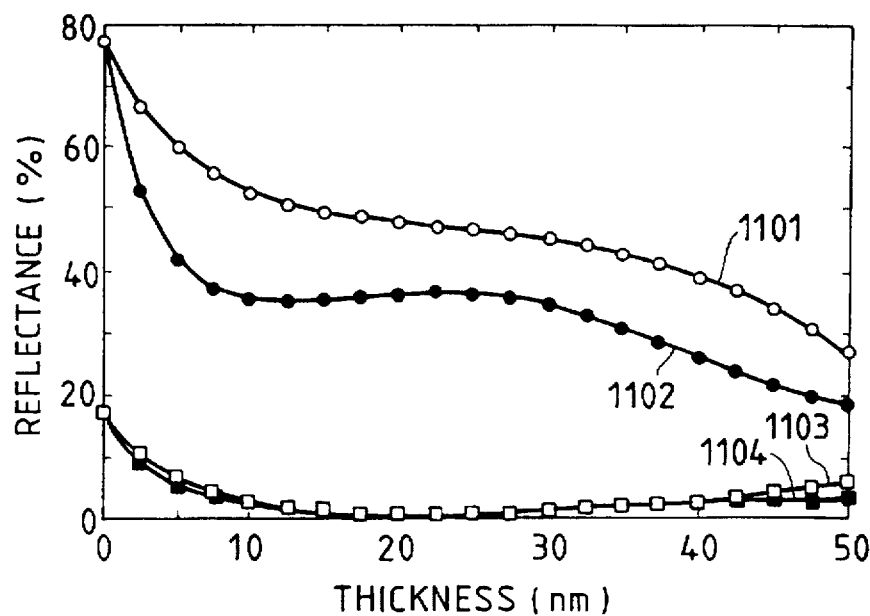
FIG. 11 is a graph illustrating a change in the reflectance of when the thickness of the recording layer of the optical disk medium of the present invention is changed.

FIG. 11 illustrates the calculated results of changes in the reflection factor of when the thickness of the recording layer 1005 of the optical disk medium of FIG. 10 is varied. Reference numeral 1101 represents a case where the recording layer 1005 is amorphous and the super-resolution layer 1003 is in the molten phase. 1102 represents a case where the recording layer 1005 is crystalline and the super-resolution layer 1003 is in the molten phase. 1103 represents a case where the recording layer 1005 is amorphous and the super-resolution layer 1003 is the solid phase, and reference numeral 1104 represents a case where the recording layer 1005 is crystalline and the super-resolution layer 1003 is in the solid phase.

When the super-resolution layer 1003 is in the solid phase, the reflection factor can be decreased to be not larger than 1%. When the super-resolution layer 1003 is in the molten state, the reflection factor can be increased to be not smaller than 30%. That is, the reflection factor changes depending upon whether the recording layer is amorphous or in the crystalline state. For instance, excellent phase-change super-resolution reproduction can be accomplished by selecting the thickness of the recording film to be 20 to 30 nm.

Figure 12:
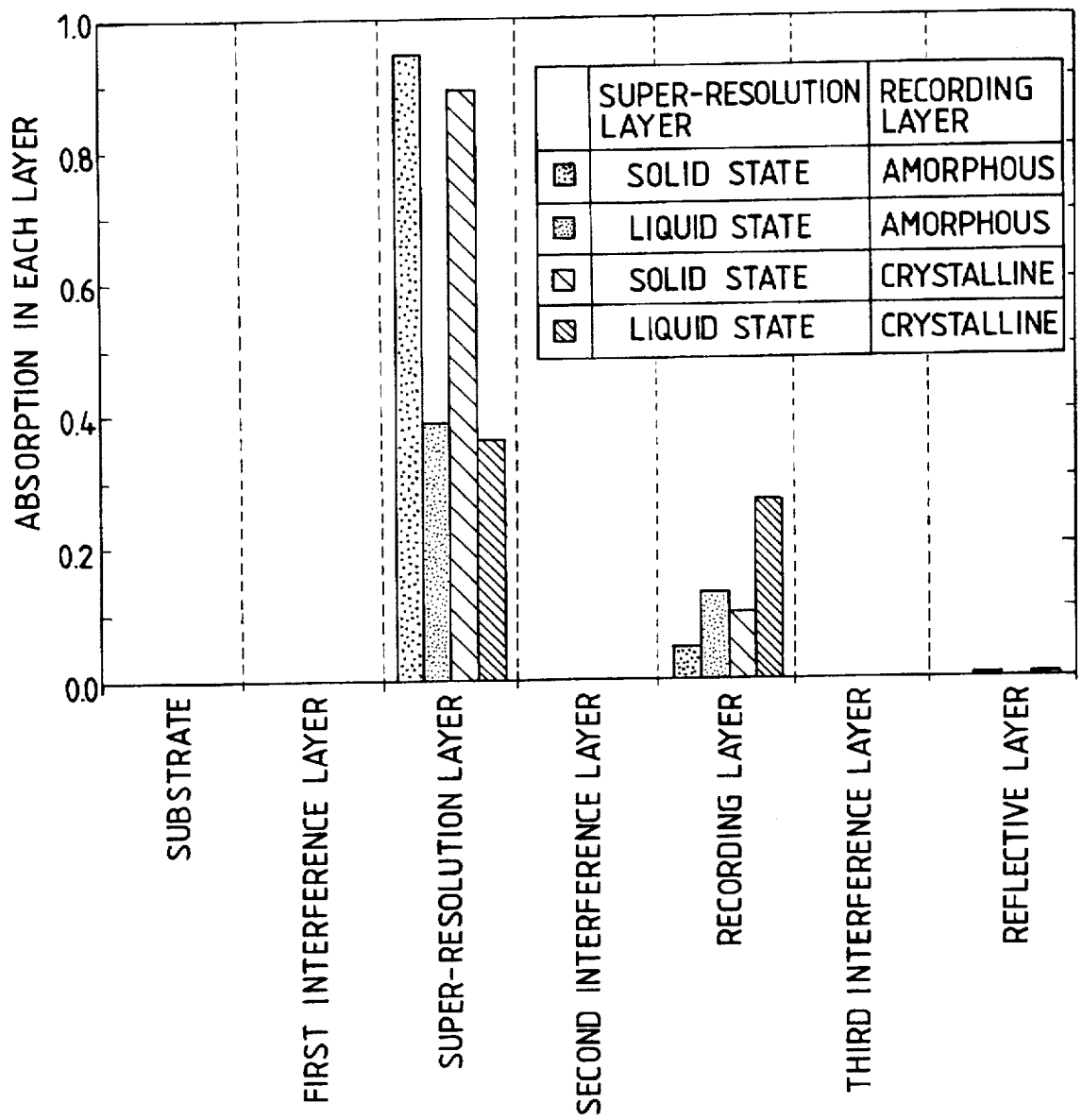
FIG. 12 is a graph illustrating the amounts of light absorbed by the layers of the optical disk medium of the present invention together with the states of the super-resolution layer and the recording layer.

FIG. 12 shows the amounts of light absorbed by the layers depending upon the states of the super-resolution layer and of the recording layer in the constitution of FIG. 10. In this layer constitution, the super-resolution layer absorbs light in amounts which are larger at all times than the amounts of light absorbed by the recording layer. Therefore, super-resolution reproduction can be realized in which the super-resolution layer only is melted during the reproduction. At the same time, the amount of absorption by the recording layer increases when the super-resolution layer is in the molten state compared with when the super-resolution layer is in the solid-phase state. Therefore, a region in which the super-resolution layer is melted near the center of the light spot works as an aperture even at the time of recording the data, making it possible to stably form a record mark which is smaller than the light spot and to increase the recording density.

FIG. 13 illustrates an embodiment of a multi-value recording system to which the present invention is favorably adapted. In this embodiment, predetermined lattice points 1301 of the optical disk medium are irradiated with a laser beam to record the data by changing the size of the record marks 1302 in two or more kinds depending upon multi-value data. The S/N ratio of the reproduced signals is improved by projecting the pulsed reproducing light as light spots 1303 onto the lattice points.

Figure 13A:
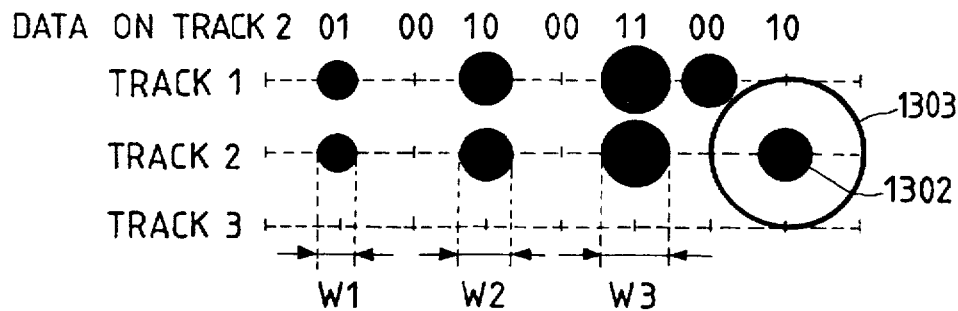
FIGS. 13a and 13b are plan view of an embodiment of a multi-value recording system to which the present invention can be suitably adapted.

FIG. 13a illustrates an example in which data of two bits "00", "01", "10" and "11" are recorded while changing the size of the mark into four kinds. No mark is recorded on the lattice points to record "00", a mark of a diameter W1 is recorded on the lattice points to record "01", a mark of a diameter W2 is recorded on the lattice points to record "10", and a mark of a diameter W3 is recorded on the lattice points to record "11". In reproducing the data, the signal amplitude is modulated on the lattice points depending upon the mark diameters 0 to W3 recorded on the lattice points. As for the mark diameters 0 to W3, the amplitude of signals on the lattice points is set to be 0 when no mark is recorded on the lattice points, the amplitude of signals reproduced on the lattice points is set to be 1 when a mark with the diameter W1 is recorded on the lattice points, the amplitude of signals reproduced on the lattice points is set to be 2 when a mark with the diameter W2 is recorded on the lattice points, and the amplitude of signals reproduced on the lattice points is set to be 3 when a mark with the diameter W3 is recorded on the lattice points. Then, "00" is reproduced when the signals reproduced on the lattice points have the amplitude 0, "01" is reproduced when the signals reproduced on the lattice points have the amplitude 1, "10" is reproduced when the signals reproduced on the lattice points have the amplitude 2, and "11" is reproduced when the signals reproduced on the lattice points have the amplitude 3, thereby to reproduce the original data.

According to the data recording system of the present invention, however, the gap (mark pitch) among the lattice points in the direction in which the light spot is scanned and the gap (track pitch) between the lattice points in the direction of the neighboring tracks are smaller than the diameter of the light spot. Therefore, when a given mark is irradiated with the light spot, other neighboring marks are partly irradiated therewith simultaneously. This causes the signals of the surrounding data marks to leak two-dimensionally into the signal of the data mark that is to be reproduced, resulting in a decrease in the precision of reproduction. Therefore, the signals are processed during the reproduction in order to decrease crosstalk from the neighboring tracks which is the two-dimensional leakage of data as well as to decrease inter-code interference from the direction of spot scanning. In a practical optical disk device, the shape and position of the record mark change due to changes in the shape of spot at the time of recording, recording power, timings of recording clocks, focusing and tracking, and besides, the amount of crosstalk and the amount of inter-code interference change due to changes in the shape of light spot at the time of reproduction, tracking, focusing and timings of sampling clocks. According to the data recording/reproducing system of the present invention, the crosstalk and the inter-code interference are effectively decreased even when such factors of change have occurred. Namely, an optimum equalization coefficient is learned in a state where the optical disk medium is mounted on the optical disk device, and a two-dimensional equalization processing is carried out based upon the equalization coefficient that is obtained as a result of learning. As for a concrete method of signal processing and an algorithm of learning, the aforementioned two-dimensional equalization processing system (Japanese Patent Laid-Open No. 257474/1990) can be directly employed.

Figure 13B:
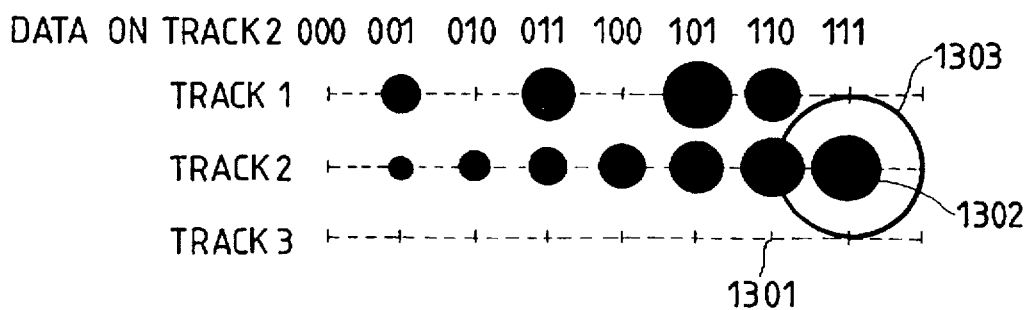

FIG. 13b illustrates a recording method in which the data of three bits are recorded as marks having eight different sizes (inclusive of when there is no mark).

The above-mentioned invention of the present application can be applied to, for example, a device shown in FIG. 15 of PCT 9500542. That is, the clock marks are reproduced with the DC reproducing light to reproduce the data with the pulsed reproduction light so that the signals are reproduced maintaining a large optical intensity while suppressing the temperature rise of the recording film. With the present invention being applied to the phase-change super-resolution technology and multi-value recording technology, it becomes possible to increase the number of times of reproduction that can be carried out and to increase the recording density owing to symmetrical aperture shape, effect of super-resolution at the time of recording and improved S/N ratio.

We claim:

1. A method of optical reproduction by irradiating clock signals formed on an optical disk medium with reproducing light, forming channel clocks from the light reflected by said optical disk medium, and irradiating said optical disk medium with reproducing light in the form of pulses in synchronism with said channel clocks when the data are to be reproduced.

2. A method of optical reproduction according to claim 1, wherein the data are recorded in said optical disk medium at a surface density of not smaller than 10 gigabits/square inch.

3. A method of optical reproduction according to claim 1, wherein the clock signals formed on said optical disk medium are irradiated with DC reproducing light.

4. A method of optical reproduction according to claim 1, wherein the light reflected by said optical disk medium is subjected to the photoelectric conversion to reproduce signals, and said reproduced signals are discriminated with discrimination threshold values consisting of binary or higher values.

5. A method of optical reproduction according to claim 1, satisfying the requirements:

$\lambda/(4 \times NA \times V) < T$, and $t < T/2$, where T denotes a time interval between the channel clocks, t denotes an irradiation time of reproducing light projected in the form of pulses, $\lambda$ denotes a wavelength of the reproducing light from the source of light, NA denotes a numerical aperture of the objective lens for converging the reproducing light, and V denotes a linear velocity of the disk that is rotating.

6. A method of optical reproduction according to claim 1, satisfying the requirements:

$\lambda/(4 \times NA \times V) < T$, and $T/4 < t < T/2$, where T denotes a time interval between the channel clocks, t denotes an irradiation time of reproducing light projected in the form of pulses, $\lambda$ denotes a wavelength of the reproducing light from the source of light, NA denotes a numerical aperture of the objective lens for converging the reproducing light, and V denotes a linear velocity of the disk that is rotating.

7. A method of optical reproduction according to claim 1, wherein the data marks formed on said optical disk medium have two kinds of sizes, said data marks are detected by using at least two or more light spots at the time of reproduction and, then, multi-value data are detected while decreasing the crosstalk and intercode interference relying upon the signal processing.

8. A method of optical reproduction according to claim 1, wherein the reproducing light in the form of said pulses has a duty of not smaller than 25% but not larger than 50%.

9. A method of optical reproduction according to claim 1, wherein the data are reproduced by detecting the rotation of polarized plane of light reflected by said optical disk.

10. A method of optical reproduction according to claim 1, wherein said optical disk medium has a layer of which the optical constant changes depending upon the solid phase and the molten phase.

11. A method of optical reproduction by forming nearly concentric circular tracks on an optical disk medium, alternatingly arranging a first region and a second region along said tracks, irradiating the marks formed in said first regions with DC reproducing light, forming channel clocks from the light reflected by said optical disk medium, and irradiating said second regions with the reproducing light in the form of pulses in synchronism with said channel clocks.

12. A method of optical reproduction according to claim 11, wherein only part of said first regions and the whole of said second regions are irradiated with the reproducing light in the form of pulses.

13. A method of reproducing data from an optical disk medium, the optical disk medium having formed thereon clock marks and data marks, the data marks representing data recorded on the optical disk medium, the method comprising the steps of:

irradiating selected ones of the clock marks on the optical disk medium with reproducing light, thereby causing the selected clock marks to reflect light;

generating channel clocks based on the light reflected by the selected clock marks;

irradiating selected ones of the data marks on the optical disk medium with pulses of reproducing light synchronized with the channel clocks, thereby causing the selected data marks to reflect light; and reproducing data from the optical disk medium based on the light reflected by the selected data marks.

14. A method according to claim 13, wherein the data is recorded on the optical disk medium at a density of not less than 10 gigabits per square inch of surface area of the optical disk medium.

15. A method according to claim 13, wherein the step of irradiating selected ones of the clock marks on the optical disk medium with reproducing light includes the step of irradiating selected ones of the clock marks on the optical disk medium with DC reproducing light having no pulses.

16. A method according to claim 13, wherein the step of reproducing data from the optical disk medium based on the light reflected by the selected data marks includes the steps of:

photoelectrically converting the light reflected by the selected data marks into reproduction signals indicative of the selected data marks; and discriminating data having at least two values from the reproduction signals based on at least one threshold value, thereby reproducing data from the optical disk medium.

17. A method according to claim 13, wherein a time interval between successive ones of the channels clocks is T; wherein the step of irradiating selected ones of the data marks on the optical disk medium with pulses of reproducing light synchronized with the channel clocks includes the steps of rotating the optical disk medium at a speed providing a linear velocity V at the selected data marks, generating pulses of reproducing light synchronized with the channel clocks, each of the pulses having a duration t, the reproducing light having a wavelength $\lambda$, and converging the pulses of reproducing light onto the selected data marks with an objective lens having a numerical aperture NA; and wherein T, V, $\lambda$, t and NA are selected to satisfy the conditions t<T/2, and $\lambda/(4 \times NA \times V) < T$.

18. A method according to claim 13, wherein a time interval between successive ones of the channels clocks is T;

wherein the step of irradiating selected ones of the data marks on the optical disk medium with pulses of reproducing light synchronized with the channel clocks includes the steps of rotating the optical disk medium at a speed providing a linear velocity V at the selected data marks, generating pulses of reproducing light synchronized with the channel clocks, each of the pulses having a duration t, the reproducing light having a wavelength $\lambda$, and converging the pulses of reproducing light onto the selected data marks with an objective lens having a numerical aperture NA; and wherein T, V, $\lambda$, t and NA are selected to satisfy the conditions T/4<t<T/2, and $\lambda/(4 \times NA \times V) < T$.

19. A method according to claim 13, wherein the data marks represent multi-value data and include data marks having at least two sizes;

wherein the step of irradiating selected ones of the data marks on the optical disk medium with pulses of reproducing light synchronized with the channel clocks includes the step of irradiating selected ones of the data marks on the optical disk medium with pulses of reproducing light synchronized with the channel clocks such that when any one of the selected data marks is being irradiated, at least a part of at least one other one of the data marks is also being irradiated; and wherein the step of reproducing data from the optical disk medium based on the light reflected by the selected data marks includes the steps of photoelectrically converting the light reflected by the selected data marks into reproduction signals indicative of the selected data marks, the reproduction signals including crosstalk and inter-code interference as a result of the fact that when any one of the selected data marks is being irradiated, at least a part of at least one other one of the data marks is also being irradiated, processing the reproduction signals to decrease the crosstalk and inter-code interference, and generating data from the processed reproduction signals, thereby reproducing data from the optical disk medium.

20. A method according to claim 13, wherein the pulses of reproducing light have a duty of at least 25% and not greater than 50%.

21. A method according to claim 13, wherein the step of reproducing data from the optical disk medium based on the light reflected by the selected data marks includes the steps of:

15 detecting a rotation of a plane of polarization of the light reflected by the selected data marks; and generating data based on the detected rotation, thereby reproducing data from the optical disk medium.

22. A method according to claim 13, wherein the optical disk medium includes a layer having an optical constant, the optical constant having a first value when the layer is in a solid phase, and having a second value different from the first value when the layer is in a liquid phase.

23. A method of reproducing data from an optical disk medium, the optical disk medium having formed thereon substantially concentric tracks, each of the tracks having a plurality of first regions and a plurality of second regions alternately arranged along the track, the first regions having marks therein, the second regions representing data recorded on the optical disk medium, the method comprising the steps of:

irradiating the marks in a selected one of the first regions with DC reproducing light having no pulses, thereby causing the marks in the selected first region to reflect light;

generating channel clocks based on the light reflected by the marks;

irradiating a selected one of the second regions with pulses of reproducing light synchronized with the channel clocks, thereby causing the second region to reflect light, the selected second region immediately following the selected first region on one of the tracks; and reproducing data from the optical disk medium based on the light reflected by the selected second region.

24. A method according to claim 23, further comprising the step of irradiating a portion of the selected first region not including the marks with pulses of reproducing light synchronized with the channel clocks;

wherein the step of irradiating a selected one of the second regions with pulses of reproducing light synchronized with the channel clocks includes the step of irradiating a selected one of the second regions with pulses of reproducing light synchronized with the channel clocks such that an entirety of the selected second region is irradiated with pulses of reproducing light synchronized with the channel clocks.

25. A method of reproducing data from an optical recording medium, the optical recording medium having formed thereon clock marks and data marks, the data marks representing data recorded on the optical recording medium, the method comprising the steps of:

irradiating a selected one of the clock marks on the optical recording medium with reproducing light, thereby causing the selected clock mark to reflect light;

generating a channel clock based on the light reflected by the selected clock mark;

irradiating a selected one of the data marks on the optical recording medium with a pulse of reproducing light, thereby causing the selected data mark to reflect light, the pulse of reproducing light being one of a train of pulses of reproducing light synchronized with the channel clock; and reproducing data from the optical recording medium based on the light reflected by the selected data mark.

26. A method according to claim 25, wherein the data is recorded on the optical recording medium at a density of not less than 10 gigabits per square inch of surface area of the optical recording medium.

27. A method according to claim 25, wherein the step of irradiating a selected one of the clock marks on the optical

16 recording medium with reproducing light includes the step of irradiating a selected one of the clock marks on the optical recording medium with DC reproducing light having no pulses.

28. A method according to claim 25, wherein the step of reproducing data from the optical recording medium based on the light reflected by the selected data mark includes the steps of:

photoelectrically converting the light reflected by the selected data mark into a reproduction signal indicative of the selected data mark; and discriminating data having one of at least two values from the reproduction signal based on at least one threshold value, thereby reproducing data from the optical recording medium.

29. A method according to claim 25, wherein a time interval between the channel clock and a preceding or succeeding channel clock is T;

wherein the step of irradiating a selected one of the data marks on the optical recording medium with a pulse of reproducing light includes the steps of moving the optical recording medium at a speed providing a linear velocity V at the selected data mark, generating a train of pulses of reproducing light synchronized with the channel clock, each of the pulses having a duration t, the reproducing light having a wavelength $\lambda$, and converging one of the pulses of reproducing light onto the selected data mark with an objective lens having a numerical aperture NA; and wherein T, V, $\lambda$, t and NA are selected to satisfy the conditions $t<T/2$, and $\lambda/(4\times NA\times V)<T$.

30. A method according to claim 25, wherein a time interval between the channel clock and a preceding or succeeding channel clock is T;

wherein the step of irradiating a selected one of the data marks on the optical recording medium with a pulse of reproducing light includes the steps of moving the optical recording medium at a speed providing a linear velocity V at the selected data mark, generating a train of pulses of reproducing light synchronized with the channel clock, each of the pulses having a duration t, the reproducing light having a wavelength $\lambda$, and converging one of the pulses of reproducing light onto the selected data mark with an objective lens having a numerical aperture NA; and wherein T, V, $\lambda$, t and NA are selected to satisfy the conditions $T/4<t<T/2$, and $\lambda/(4\times NA\times V)<T$.

31. A method according to claim 25, wherein the data marks represent multi-value data and include data marks having at least two sizes;

wherein the step of irradiating a selected one of the data marks on the optical recording medium with a pulse of reproducing light includes the step of irradiating a selected one of the data marks on the optical recording medium with a pulse of reproducing light such that when the selected data mark is being irradiated, at least a part of at least one other one of the data marks is also being irradiated; and wherein the step of reproducing data from the optical recording medium based on the light reflected by the selected data mark includes the steps of photoelectrically converting the light reflected by the selected data mark into a reproduction signal indicative of the selected data mark, the reproduction signal including crosstalk and inter-code interference as a result of the fact that when the selected data mark is being irradiated, at least a part of at least one other one of the data marks is also being irradiated, processing the reproduction signal to decrease the crosstalk and inter-code interference, and generating data from the processed reproduction signal, thereby reproducing data from the optical recording medium.

32. A method according to claim 25, wherein the pulses of reproducing light have a duty of at least 25% and not greater than 50%.

33. A method according to claim 25, wherein the step of reproducing data from the optical recording medium based on the light reflected by the selected data mark includes the steps of:

detecting a rotation of a plane of polarization of the light reflected by the selected data mark; and generating data based on the detected rotation, thereby reproducing data from the optical recording medium.

34. A method according to claim 25, wherein the optical recording medium includes a layer having an optical constant, the optical constant having a first value when the layer is in a solid phase, and having a second value different from the first value when the layer is in a liquid phase.

35. A method of reproducing data from an optical recording medium, the optical recording medium having formed thereon clock marks and data marks, the data marks representing data recorded on the optical recording medium, the method comprising the steps of:

irradiating a selected one of the clock marks on the optical recording medium with DC reproducing light having no pulses, thereby causing the selected clock mark to reflect light;

generating a channel clock based on the light reflected by the selected clock mark;

irradiating a selected one of the data marks on the optical recording medium with a pulse of reproducing light, thereby causing the selected data mark to reflect light, the pulse of reproducing light being one of a train of pulses of reproducing light synchronized with the channel clock; and reproducing data from the optical recording medium based on the light reflected by the selected data mark.

36. A method according to claim 35, wherein the data is recorded on the optical recording medium at a density of not less than 10 gigabits per square inch of surface area of the optical recording medium.

37. A method according to claim 35, wherein the step of reproducing data from the optical recording medium based on the light reflected by the selected data mark includes the steps of:

photoelectrically converting the light reflected by the selected data mark into a reproduction signal indicative of the selected data mark; and discriminating data having one of at least two values from the reproduction signal based on at least one threshold value, thereby reproducing data from the optical recording medium.

38. A method according to claim 35, wherein a time interval between the channel clock and a preceding or succeeding channel clock is T;

wherein the step of irradiating a selected one of the data marks on the optical recording medium with a pulse of reproducing light includes the steps of moving the optical recording medium at a speed providing a linear velocity V at the selected data mark, generating a train of pulses of reproducing light synchronized with the channel clock, each of the pulses having a duration t, the reproducing light having a wavelength $\lambda$, and converging one of the pulses of reproducing light onto the selected data mark with an objective lens having a numerical aperture NA; and wherein T, V, $\lambda$, t and NA are selected to satisfy the conditions $t < T/2$, and $\lambda/(4 \times NA \times V) < T$.

39. A method according to claim 35, wherein a time interval between the channel clock and a preceding or succeeding channel clock is T;

wherein the step of irradiating a selected one of the data marks on the optical recording medium with a pulse of reproducing light includes the steps of moving the optical recording medium at a speed providing a linear velocity V at the selected data mark, generating a train of pulses of reproducing light synchronized with the channel clock, each of the pulses having a duration t, the reproducing light having a wavelength $\lambda$, and converging one of the pulses of reproducing light onto the selected data mark with an objective lens having a numerical aperture NA; and wherein T, V, $\lambda$, t and NA are selected to satisfy the conditions $T/4 < t < T/2$, and $\lambda/(4 \times NA \times V) < T$.

40. A method according to claim 35, wherein the data marks represent multi-value data and include data marks having at least two sizes;

wherein the step of irradiating a selected one of the data marks on the optical recording medium with a pulse of reproducing light includes the step of irradiating a selected one of the data marks on the optical recording medium with a pulse of reproducing light such that when the selected data mark is being irradiated, at least a part of at least one other one of the data marks is also being irradiated; and wherein the step of reproducing data from the optical recording medium based on the light reflected by the selected data mark includes the steps of photoelectrically converting the light reflected by the selected data mark into a reproduction signal indicative of the selected data mark, the reproduction signal including crosstalk and inter-code interference as a result of the fact that when the selected data mark is being irradiated, at least a part of at least one other one of the data marks is also being irradiated, processing the reproduction signal to decrease the crosstalk and inter-code interference, and generating data from the processed reproduction signal, thereby reproducing data from the optical recording medium.

41. A method according to claim 35, wherein the pulses of reproducing light have a duty of at least 25% and not greater than 50%.

42. A method according to claim 35, wherein the step of reproducing data from the optical recording medium based on the light reflected by the selected data mark includes the steps of:
   detecting a rotation of a plane of polarization of the light reflected by the selected data mark; and
   generating data based on the detected rotation, thereby reproducing data from the optical recording medium.

43. A method according to claim 35, wherein the optical recording medium includes a layer having an optical constant, the optical constant having a first value when the layer is in a solid phase, and having a second value different from the first value when the layer is in a liquid phase.

44. A method of reproducing data from an optical disk medium, the optical disk medium having formed thereon pre-pits and data marks, the data marks representing data recorded on the optical disk medium, the method comprising the steps of:
   detecting a selected one of the pre-pits on the optical disk medium;
   generating a clock signal based on the detected selected pre-pit;
   irradiating a selected one of the data marks on the optical disk medium with a pulse of reproducing light, thereby causing the selected data mark to reflect light, the pulse of reproducing light being one of a train of pulses of reproducing light synchronized with the clock signal; and
   reproducing data from the optical disk medium based on the light reflected by the selected data mark.

45. A method according to claim 44, wherein the data is recorded on the optical disk medium at a density of not less than 10 gigabits per square inch of surface area of the optical disk medium.

46. A method according to claim 44, wherein the step of detecting a selected one of the pre-pits includes the step of detecting a selected one of the pre-pits on the optical disk medium with DC reproducing light having no pulses.

47. A method according to claim 44 wherein the step of reproducing data from the optical disk medium based on the light reflected by the selected data mark includes the steps of:
   photoelectrically converting the light reflected by the selected data mark into a reproduction signal indicative of the selected data mark; and
   discriminating data having one of at least two values from the reproduction signal based on at least one threshold value, thereby reproducing data from the optical disk medium.

48. A method according to claim 44, wherein a time interval between the clock signal and a preceding or succeeding clock signal is T;
   wherein the step of irradiating a selected one of the data marks on the optical disk medium with a pulse of reproducing light includes the steps of
   rotating the optical disk medium at a speed providing a linear velocity V at the selected data mark,
   generating a train of pulses of reproducing light synchronized with the clock signal, each of the pulses having a duration t, the reproducing light having a wavelength $\lambda$, and
   converging one of the pulses of reproducing light onto the selected data mark with an objective lens having a numerical aperture NA; and
   wherein T, V, $\lambda$, t and NA are selected to satisfy the conditions
   $t<T/2$, and
   $\lambda/(4\times NA\times V)<T$.

49. A method according to claim 44, wherein a time interval between the clock signal and a preceding or succeeding clock signal is T;
   wherein the step of irradiating a selected one of the data marks on the optical disk medium with a pulse of reproducing light includes the steps of
   rotating the optical disk medium at a speed providing a linear velocity V at the selected data mark,
   generating a train of pulses of reproducing light synchronized with the clock signal, each of the pulses having a duration t, the reproducing light having a wavelength $\lambda$, and
   converging one of the pulses of reproducing light onto the selected data mark with an objective lens having a numerical aperture NA; and
   wherein T, V, $\lambda$, t and NA are selected to satisfy the conditions
   $T/4<t<T/2$, and
   $\lambda/(4\times NA\times V)<T$.

50. A method according to claim 44, wherein the data marks represent multi-value data and include data marks having at least two sizes;
   wherein the step of irradiating a selected one of the data marks on the optical disk medium with a pulse of reproducing light includes the step of irradiating a selected one of the data marks on the optical disk medium with a pulse of reproducing light such that when the selected data mark is being irradiated, at least a part of at least one other one of the data marks is also being irradiated; and
   wherein the step of reproducing data from the optical disk medium based on the light reflected by the selected data mark includes the steps of
   photoelectrically converting the light reflected by the selected data mark into a reproduction signal indicative of the selected data mark, the reproduction signal including crosstalk and inter-code interference as a result of the fact that when the selected data mark is being irradiated, at least a part of at least one other one of the data marks is also being irradiated,
   processing the reproduction signal to decrease the crosstalk and inter-code interference, and
   generating data from the processed reproduction signal, thereby reproducing data from the optical disk medium.

51. A method according to claim 44, wherein the pulses of reproducing light have a duty of at least 25% and not greater than 50%.

52. A method according to claim 44, wherein the step of reproducing data from the optical disk medium based on the light reflected by the selected data mark includes the steps of:
   detecting a rotation of a plane of polarization of the light reflected by the selected data mark; and
   generating data based on the detected rotation, thereby reproducing data from the optical disk medium.

53. A method according to claim 44, wherein the optical disk medium includes a layer having an optical constant, the optical constant having a first value when the layer is in a solid phase, and having a second value different from the first value when the layer is in a liquid phase.

54. A method of reproducing data from an optical disk medium, the optical disk medium having formed thereon a plurality of first regions and a plurality of second regions, the first regions each having at least one clock mark therein, the second regions each having at least one data mark therein, the at least one data mark representing data recorded on the optical disk medium, the method comprising the steps of:

detecting a selected one of the at least one clock mark in a selected one of the first regions;

generating a clock signal based on the detected clock mark;

irradiating a selected one of the at least one data mark in a selected one of the second regions with a pulse of reproducing light, thereby causing the selected data mark to reflect light, the pulse of reproducing light being one of a train of pulses of reproducing light synchronized with the clock signal; and reproducing data from the optical disk medium based on the light reflected by the selected data mark.

55. A method according to claim 54, wherein the data is recorded on the optical disk medium at a density of not less than 10 gigabits per square inch of surface area of the optical disk medium.

56. A method according to claim 54, wherein the step of detecting a selected one of the at least one clock mark in a selected one of the first regions includes the step of detecting a selected one of the at least one clock mark in a selected one of the first regions with DC reproducing light having no pulses.

57. A method according to claim 54, wherein the step of reproducing data from the optical disk medium based on the light reflected by the selected data mark includes the steps of:

photoelectrically converting the light reflected by the selected data mark into a reproduction signal indicative of the selected data mark; and discriminating data having one of at least two values from the reproduction signal based on at least one threshold value, thereby reproducing data from the optical disk medium.

58. A method according to claim 54, wherein a time interval between the clock signal and a preceding or succeeding clock signal is T;

wherein the step of irradiating a selected one of the at least one data mark in a selected one of the second regions with a pulse of reproducing light includes the steps of rotating the optical disk medium at a speed providing a linear velocity V at the selected data mark, generating a train of pulses of reproducing light synchronized with the clock signal, each of the pulses having a duration t, the reproducing light having a wavelength $\lambda$, and converging one of the pulses of reproducing light onto the selected data mark with an objective lens having a numerical aperture NA; and wherein T, V, $\lambda$, t and NA are selected to satisfy the conditions $t<T/2$, and $\lambda/(4\times NA\times V)<T$.

59. A method according to claim 54, wherein a time interval between the clock signal and a preceding or succeeding clock signal is T;

wherein the step of irradiating a selected one of the at least one data mark in a selected one of the second regions with a pulse of reproducing light includes the steps of rotating the optical disk medium at a speed providing a linear velocity V at the selected data mark, generating a train of pulses of reproducing light synchronized with the clock signal, each of the pulses having a duration t, the reproducing light having a wavelength $\lambda$, and converging one of the pulses of reproducing light onto the selected data mark with an objective lens having a numerical aperture NA; and wherein T, V, $\lambda$, t and NA are selected to satisfy the conditions $T/4<t<T/2$, and $\lambda/(4\times NA\times V)<T$.

60. A method according to claim 54, wherein the at least one data mark represents multi-value data and includes at least one data mark having one of at least two sizes;

wherein the step of irradiating a selected one of the at least one data mark in a selected one of the second regions with a pulse of reproducing light includes the step of irradiating a selected one of the at least one data mark in a selected one of the second regions with a pulse of reproducing light such that when the selected data mark is being irradiated, at least a part of at least one other data mark is also being irradiated; and wherein the step of reproducing data from the optical disk medium based on the light reflected by the selected data mark includes the steps of photoelectrically converting the light reflected by the selected data mark into a reproduction signal indicative of the selected data mark, the reproduction signal including crosstalk and inter-code interference as a result of the fact that when the selected data mark is being irradiated, at least a part of at least one other data mark is also being irradiated, processing the reproduction signal to decrease the crosstalk and inter-code interference, and generating data from the processed reproduction signal, thereby reproducing data from the optical disk medium.

61. A method according to claim 54, wherein the pulses of reproducing light have a duty of at least 25% and not greater than 50%.

62. A method according to claim 54, wherein the step of reproducing data from the optical disk medium based on the light reflected by the selected data mark includes the steps of:

detecting a rotation of a plane of polarization of the light reflected by the selected data mark; and generating data based on the detected rotation, thereby reproducing data from the optical disk medium.

63. A method according to claim 54, wherein the optical disk medium includes a layer having an optical constant, the optical constant having a first value when the layer is in a solid phase, and having a second value different from the first value when the layer is in a liquid phase.

64. A method according to claim 54, further comprising the step of irradiating a portion of the selected first region not including the at least one clock mark with pulses of reproducing light synchronized with the clock signal;

wherein the step of irradiating a selected one of the at least one data mark in a selected one of the second regions with a pulse of reproducing light includes the step of irradiating a selected one of the at least one data mark in a selected one of the second regions with a pulse of reproducing light such that an entirety of the selected second region is irradiated with pulses of reproducing light synchronized with the clock signal.

* * * * *